Patented June 8, 1948

2,442,969

UNITED STATES PATENT OFFICE 2,442,969

MANUFACTURE OF DEFLUORINATED TRICALCIUM PHOSPHATE

Charles A. Butt, Atlanta, Ga., assignor to International Minerals & Chemical Corporation, Chicago, Ill., a corporation of New York No Drawing. Application May 16, 1946, Serial No. 670,299

4 Claims. (Cl. 99—2)

The invention relates to the manufacture of defluorinated tricalcium phosphate which is useable to good advantage in animal feeds, generally as an added ingredient for supplying any needed amount of phosphorus and incidentally, calcium.

The invention is of particular value in producing the above stated material from mineral phosphates which usually occur in the form of apatite which is a natural mineral containing calcium phosphate combined (a) with fluorine to form fluorapatite, or (b) with chlorine to form chlorapatite, or a combination of the two materials.

It is understood that all of the important natural deposits of natural phorphate in the United States and in most foreign countries contain the valuable calcium and phosphorus ingredients in the form of fluorapatite, the formula of which may be written as

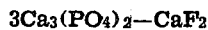

or

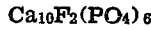

or

According to this formula the phosphate rock, if composed wholly of fluorapatite, contains 3.77% of fluorine. However, due to the presence of impurities and also due to the conditions under which the natural deposit was formed, the fluorine content may vary considerably. Concentrated Tennessee brown rock containing about 25 to 33% of $P_2O_5$ and about 55 to 72% of BPL (bone phosphate of lime or tricalcium phosphate or ortho phosphate $Ca_3(PO_4)_2$ or $3CaO—P_2O_5$) usually contains about 3.0 to 3.5% of fluorine, whereas Florida pebble rock containing 75% of BPL and about 34% of $P_2O_5$ will contain about 3.8% fluorine. Most rocks also contain, as impurities, in addition to silica, small but significant percentages of the oxides of magnesium, sodium, potassium, iron and aluminum, and small amounts of $SO_3$ and $CO_2$. The normal fluorine content of the rock is altogether too high to permit use of the same as an ingredient of animal feeds, and it is considered desirable to reduce the fluorine content to an amount not substantially greater than that which occurs in steamed bone meal. Steamed bone meal usually contains about 30% of $P_2O_5$ and about .06% of fluorine, or slightly more fluorine in some cases. Because of the serious results in continued feeding of significant amounts of fluorine to animals, particularly to cattle, the value and saleability of a so-called defluorinated phosphate feed has been usually determined by the percentage of fluorine which it contains. A fluorine percentage of not more than .1% in a phosphate feed containing at least 30% of $P_2O_5$ is considered acceptable at the present time.

Under certain conditions, by the exercise of extreme care, it is possible to reduce the fluorine content of ground natural phosphate rock by means of a calcining operation involving a temperature of about 1450° C., but because of the difficulties involved in carrying on a commercial calcining operation at such a high temperature, it has been the general practice in the commercial manufacture of defluorinated phosphate feed before calcining, to pretreat the phosphate rock with sulphuric acid to convert the rock into so-called den superphosphate.

Den superphosphate is the principal phosphate fertilizer, it having been recognized many years ago that natural apatite is not very soluble in the waters of the soil and has to be decomposed in order to make the phosphorus promptly available for plant growth. This sulphuric acid treatment of phosphate rock breaks up the molecule and frees and drives off about 25% of fluorine. The remainder of the fluorine being about 1.8% in the cured superphosphate, may be driven off by any ordinary calcining operation at relatively low temperature, for example, 800° C. However, in this combined process the calcium phosphate is first changed from the acid or mono phosphate to meta phosphate and then as the temperature is raised pyro phosphate is formed due to some loss of sulphate. The pyro phosphate is not now considered to be the best type for stock feeding purposes, and therefore, the calcining temperature is raised to about 1000° C. so as to drive off most of the sulphur, and thus bring back the material to the tricalcium form.

The aforementioned process is relatively expensive because, for each ton of rock it is necessary to use about the same amount of 50 degree Baumé sulphuric acid, and the final product contains no more $P_2O_5$ than the original ton of phosphate rock contained. Then there is the expense of the acidulating step, the delivering of the material into and out of the den, the curing of the superphosphate and the handling operations in connection with the calcining step, in addition to the expense of the calcining step itself. Furthermore, in the calcining operation, in order to produce a material having a desired percentage, i. e., 30% of $P_2O_5$, in BPL form, it is necessary to drive off about 80% or more of the sulphur. The fumes coming from the calciner, containing this sulphur, in the form of $SO_2$ or $SO_3$, have a corrosive effect upon the equipment and are objectionable from the standpoint of their effect upon animal and vegetable life. Hence it is necessary to carry on this calcining operation in sparsely inhabited areas because no practical method has yet been developed for absorbing all of the sulphur gases before they escape into the atmosphere.

The principal objects of the present invention are to provide a process for making a feed ingredient of the class described which will have a high percentage of $P_2O_5$ in a form available for feed purposes while having an extremely small percentage of harmful fluorine, to avoid the dissemination of obnoxious gases during such a process, and in general to provide a practical, economical and efficient process of the character referred to.

In my previous patent, No. 2,360,197, issued October 10, 1944, I have disclosed various processes for manufacturing defluorinated phosphate, including a process for calcining triple superphosphate. Triple superphosphate is made by treating each ton of Florida rock with about two tons of commercial or fertilizer grade phosphoric acid ($H_3PO_4$) of about 60° Baumé strength, containing about 62.5% $P_2O_5$. As stated in my previous patent, it is possible to remove the fluorine successfully by calcining the material at a reasonable temperature, but in order to prevent fusion or sticking of the material during the calcining operation, some lime or other suitable material was added to the charge.

Until rather recently it was not believed that the phosphate of a defluorinated phosphate feed had to be of any particular form, so long as the fluorine was reduced to the desired low percentage. But recent feeding experiments with animals now indicate that better results are obtained with calcium ortho-phosphate than with calcium phosphate in other forms. That is why the high temperature calcination of the den superphosphate, which produces a tricalcium phosphate, has been favored as compared with the triple super calcining process which produces a product containing phosphate of a different form.

I have found that the difficulty encountered in driving off the fluorine from phosphate rock by any ordinary calcining operation is due to the fact that the rock contains an excess percentage of calcium over that which is combined with the $P_2O_5$ in the form of tricalcium phosphate $Ca_3(PO_4)_2$. This excess of calcium comes from the $CaF_2$ part of the apatite molecule and from any calcium carbonate present in the rock. In the calcining of den superphosphate to make a mineral feed, this excess of calcium has been taken up by the sulphuric acid, forming calcium sulphate (gypsum) or, in the case of my patented process (U. S. Pat. No. 2,360,197) by the phosphoric acid used in making the triple superphosphate. In either case, due to the large amount of acid used in making the superphosphate, the fluorine can be driven off at relatively low temperature. In the case of the den super calcining process, the phosphate can be brought back to the ortho form by further calcining at a higher temperature, but, in my patented process, this does not appear to be feasible on account of fusion and sticking difficulties when using the higher temperatures, nor was sufficient calcium added to form tricalcium phosphate, but only enough to prevent excessive sticking at the calcining temperature employed.

*General method*

I have discovered that the desired object, i. e., the production of a mineral feed of low fluorine content and in which at least 80% of the phosphate is in the ortho form, can be accomplished by calcining in a single operation at a reasonable temperature, for example between 1100 and 1300° C., with a reasonable amount of agitation, a mixture consisting of ground phosphate rock and a material containing sufficient additional $P_2O_5$ in available form so that, in the final product the mole ratio represented by the following formula is between 2.7 and 3.1

$$\frac{\text{Moles of } CaO + MgO + Na_2O + K_2O - SO_3 - F_2}{\text{Moles of } P_2O_5 - Fe_2O_3 - Al_2O_3}$$

where the amounts of the substances are expressed in molecules or moles (computed in each instance by dividing the total weight of each substance by its molecular weight). The silica may be disregarded. In the absence of impurities, this mole ratio in the case of tri-calcium (ortho) phosphate, $Ca_3(PO_4)_2$, i. e.

$$\frac{3 \text{ mols } CaO}{1 \text{ mol. } P_2O_5}$$

would of course be 3.0. When other alkaline constituents such as MgO, $Na_2O$ and $K_2O$ are present in addition to CaO their amount in moles is added as indicated by plus signs to the mole quantity of CaO in the formula. When acidic constituents, such as $SO_3$ and $F_2$, are present, as indicated by minus signs their amount in moles is subtracted from the moles of CaO and other alkaline constituents in the formula. When impurities consisting of $Fe_2O_3$ and $Al_2O_3$ are present, their amount in moles is subtracted from the moles of $P_2O_5$ as indicated by minus signs in the formula.

I have also discovered that apparently some water vapor should be present during the calcining operation. With gas or oil employed as the fuel, the water formed by the combustion, together with what is naturally present in the atmosphere, is usually sufficient. Under other conditions, it may be advantageous to inject steam or water into the lower end of the calciner.

Inasmuch as my improved process produces no acid or other corrosive fumes other than fluorine, which may be collected without too much difficulty, there is no public nuisance problem.

This process involves a number of difficulties or problems which are not encountered in the process of producing this feed material by calcining ordinary den superphosphate. In the den superphosphate process, good results can be obtained by almost any kind of a commercial calcining operation, provided that the temperature is high enough to drive off most of the sulphur. My improved process as herein described is not so simple. In the first place, I have not found it possible to obtain a satisfactory elimination of fluorine at a lower temperature than about 1100° C. or higher, whereas in the den superphosphate calcining process, the fluorine may be eliminated satisfactorily at a temperature of not much more than 800° C.

In the second place, in my process, the material preferably is exposed to the calciner gases more gradually and for a longer time than in the case of the older process. This can be accomplished by using a long kiln, for example a kiln 80 feet long compared with a 30 foot kiln in the above-described old superphosphate process, or by vigorous agitation of small quantities of the ground material, or both. Fine grinding of the rock also appears to facilitate the elimination of fluorine. I have already referred to the apparent necessity for the presence of some added moisture in certain cases.

I can use, as an addition material, any substance which contains the $P_2O_5$ in available form, (meaning in the acid form, or in the form of a substance having a low mole ratio (less than 3) computed in accordance with the above formula). For example, phosphoric acid, the mono phosphates or di-phosphates of lime or other non basic phosphate compounds.

*Example 1*

1000 lbs. of 77% BPL Florida rock ground to such a size that 94% of the material will pass through a 60 mesh screen, is mixed with about 380 lbs. of commercial phosphoric acid produced from Florida rock by the wet process, said acid having a concentration represented by 53.5° Baumé at 130° F. This wet-process phosphoric acid can be used in crude form, and if made on the spot, goes into the batch at a relatively low cost.

It will be borne in mind that the phosphoric acid contains as impurities certain minor percentages of aluminum, potassium, sodium and iron, therefore, the Baumé reading is not a true index of the percentage of phosphoric acid. The Florida rock used in the process, in addition to calcium phosphate and fluorine, also contains some iron, aluminum, magnesium, sodium and potassium, which enter into the final product. Therefore, in making up a batch, it is understood that it will be necessary to have an analysis of the raw material and of the commercial phosphoric acid used in order to compute the amount of phosphoric acid to be used in order to obtain the desired mole ratio in the final product. In this case the optimum mole ratio according to the formula heretofore set forth has been found to be about 2.9 in the final product.

In the actual commercial practice, there is not much variation in the analysis of the rock, and the same applies to the commercial phosphoric acid, so that after one or two trials, the amount of phosphoric acid which will give the desired mole ratio in the final product and which will give the required fluorine elimination and desired percentage of tricalcium phosphate, having once been ascertained, need not be readjusted as long as the process is being operated with the same grade of rock and phosphoric acid.

The acid is mixed with the ground rock in a mixer which may be of the batch or pan type, or in a continuous mixer such as employed in the den superphosphate aciduating step. The mixing operation should not require more than a few minutes. The material is then dumped out and left in a pile to cure for from one to twenty-four hours, although it does not seem necessary to cure for more than about three hours. Since there is no substantial evolution of heat or gases, there is only a very slight loss of weight due to some drying out of moisture. Before being fed into the calciner, the mixture is reground so that it will all pass through a 6-mesh screen.

The calcining is effected in a rotary kiln of the cement or lime burning counter-flow type, and has an effective length of 80 feet and an internal diameter of 6 feet. The slope is about 1 inch in each 8 feet and the kiln is revolved at about 2.5 R. P. M. The calciner was heated by fuel oil, the flame of the burner being directed into the lower or product-discharge end of the calciner. For the purpose of effecting proper agitation or stirring of the material, the interior surface of the brick lining of the calciner is ribbed or corrugated longitudinally or spirally, or is provided with a large number of projections which serve to prevent the body of the material from sliding around and to compel the material to tumble through the flame. In a calciner of the size indicated, these ribs or projections which may be continuous from end to end of the kiln or may be interrupted, are conveniently made about 2 inches high and are so spaced that there will be ten ribs or rows of projections around the interior circumference of the kiln.

In the present instance, the mixture was fed to the calciner at the rate of 1500 lbs. per hour. Due to calcining there was a reduction in weight of 20 to 25% of the original quantity of the mixture, and therefore the finished product was produced at the rate of 1100 to 1200 lbs. per hour, representing about 1000 to 1100 lbs. of product for each 1000 lbs. of rock. The time required for the material to pass through the calciner was approximately 1½ hours. In the summertime, in hot weather when the humidity is very high, it is not necessary to use any additional moisture or steam, but in the wintertime, or when the air contains a relatively small amount of moisture, the process appears to give better results when steam is added at the rate of about 10 to 25 lbs. per minute. This is done by injecting water in the form of a spray directly into the top of the flame from the burner.

The effective calcining temperature was found to be about 1200° C. at the hottest point in the calciner, which was determined to be about 8 feet from the burner or product-discharge end of the calciner. This temperature was measured by using a protected or encased thermo-couple extending through the lining and protruding into the kiln a distance of about 1½ inches.

Typical percentage analyses of the raw materials and of the final product were as follows:

| | 1000 lbs. Florida Rock | 380 lbs. Phosphoric acid | About 1050 lbs. Final Product |
|---|---|---|---|
| $SiO_2$ | 5.0 | Not Det. | Not Det. |
| $K_2O$ | .1 | .2 | .2. |
| $Na_2O$ | .2 | .3 | .25. |
| $SO_3$ | .5 | 4.7 | .05. |
| CaO | 49.35 | 1.4 | 45.5. |
| MgO | .20 | .20 | .25. |
| Total $P_2O_5$ | 34.75 | 33.0 | 45.5. |
| $P_2O_5$ | | 24.8 (free) | 44.7 (as ortho). |
| $Fe_2O_3$ | 1.0 | 3.0 | 2.0. |
| $Al_2O_3$ | .85 | 2.85 | 2.0. |
| $CO_2$ | 2.60 | Not Det. | Not Det. |
| F | 3.85 | 1.9 | .038. |
| $H_2O$ at 105° | .70 | Not Det. | None. |
| Mole ratio | | | 2.9. |

The percentage of ortho-phosphate was determined as follows:

Weigh 0.4 gram sample (—40 mesh) into a 600 ml. beaker. Add 400 ml. of 0.4% HCl solution and stir for 2 hours at 98–99° F. Pour into a 500 ml. volumetric flask and make to mark with water. Shake to mix and filter. Pipette 100 ml. (equiv. to 0.08 gram) into each of two 250 ml. beakers. Add immediately 30 ml. ammonium nitrate solution (40%), 40–45 ml. ammonium molybdate solution and stir one of the beakers for 20 minutes, and the other for 40 minutes at room temp. (30° C.). Filter off and wash the yellow precipitate immediately as each beaker is removed from the stirrer.

Titrate for percentage of $P_2O_5$ in the usual way. Ml. of .3238N NaOH required $\times 1.25 = \% P_2O_5$.

Deduct the result obtained by the 20 minute stirring period from the result representing the 40 minute period (to obtain percentage $P_2O_5$ representing the amount of orthophosphate formed by hydrolysis under the conditions in 20 minutes) and subtract this result from the result for the 20 minute stirring period to obtain percentage $P_2O_5$ in the sample as soluble orthophosphate. Note: This method is based on the fact that meta and pyrophosphates are not precipitated by ammonium molybdate and that the rate of change to the ortho form in .4% HCl solution at 98–99° F., is extremely slow.

*Example 2*

Instead of adding the $P_2O_5$ in the form of phosphoric acid, a sufficient amount of triple superphosphate, the monophosphate $Ca(H_2PO_4)_2$ may be used so that the desired mole ratio in the final product may be obtained. In this instance, it was necessary to use about 360 lbs. of triple super (containing 45% $P_2O_5$) in place of the commercial acid used in Example 1. The exact amount to be used depends upon the analysis and impurities in the triple super. In a typical example, amounts and analyses were as follows:

|  | 1000 lbs. Phos. Rock | 360 lbs. Triple Super | 1360 lbs. Mixture | 1100 lbs. Product |
|---|---|---|---|---|
| $P_2O_5$ per cent | 34.75 | 48.16 | 38.30 | 46.0 (45.0 ortho) |
| CaO do | 49.36 | 18.44 | 41.18 | 49.5 |
| MgO do | 0.20 | 0.28 | 0.22 | .25 |
| $Na_2O$ do | 0.20 | 0.30 | 0.23 | .3 |
| $K_2O$ do | 0.10 | 0.30 | 0.15 | .2 |
| $Fe_2O_3$ do | 0.96 | 1.76 | 1.17 | 1.5 |
| $Al_2O_3$ do | 0.84 | 1.41 | 0.99 | 1.2 |
| $CO_2$ do | 2.62 | 0.00 | 1.92 |  |
| $SO_3$ do | 0.50 | 1.75 | .83 |  |
| F do | 3.85 | 2.49 | 3.49 | .1 |
| $H_2O$ at 105° C. do | 0.70 | 3.00 |  |  |
| Mole Ratio | 3.86 | 1.09 | 2.94 | 2.9 |

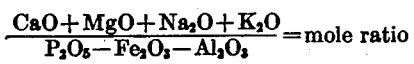

$$\frac{CaO + MgO + Na_2O + K_2O}{P_2O_5 - Fe_2O_3 - Al_2O_3} = \text{mole ratio}$$

*2-step method*

As has been stated above, the above described 1-step calcining process is quite practical and is now being used commercially with good results. However, in inexperienced hands unless operated carefully the process may result in the production of a final product having too high a mole ratio, indicating the addition of too little phosphoric acid, as a result of which the fluorine content may be too high, or the final product may have too low a mole ratio, indicating the addition of too much phosphoric acid, in which case the fluorine content of the product will be low enough but the percent of ortho phosphate will be lower than is thought to be desirable.

Because of the rather critical relationship between the final mole ratio and the quality of the product, I have found that a final product containing low fluorine and high ortho can be obtained with less difficulty by the employment of a 2-step calcining operation. In this 2-step process accurate control of the analysis of the mixture and of the mole ratio of the final product is not so necessary.

In this 2-step process, the first calcining operation is effected at a temperature of about 1100° to 1200° C., sufficient additional phosphoric acid or equivalent material being added so that the mixture will contain enough $P_2O_5$ to give an intermediate product having a mole ratio below about 2.7 according to the formula beforestated. In using the formula, the fluorine and $SO_3$ which are substantially eliminated in the calcination may be disregarded and the mole ratio figured on the raw mixture. Sufficient excess of phosphoric acid is used as will always insure that the product of the first calcination has a fluorine content of not more than .10%. The ortho phosphate content of this intermediate product, made with this relatively high percentage of phosphoric acid, will be lower than is desired, a relatively large percentage of $P_2O_5$ in this product being in the form of pyro phosphate. But so long as the fluorine content of this intermediate product is low enough, it is not necessary to be concerned about the particular form of phosphate, because this will be taken care of in the second calcining operation.

In the second calcining operation, the intermediate product produced by the first calcination is ground to about 50 mesh and is mixed with a basic or alkaline material such as lime, hydrated lime, calcium carbonate, magnesium oxide, sodium hydroxide, or other available alkaline material, the quantity used being sufficient to bring the mole ratio of the final product to substantially about 2.8, for example, to about 3.0 or slightly higher. This will insure that in the second calcining operation there will be enough alkaline or basic material to convert all of the pyro phosphate into ortho phosphate. To facilitate the operation, about 20% of water may be added to the mix.

In the first calcination in the 2-step method, the same other conditions, including the size and type of kiln, temperature, agitation, and addition of water, may be employed, as in the case of the 1-step process. A calcining temperature of 1000° C. is ordinarily sufficient in the second calcining operation, and it is not necessary to add any moisture to the kiln.

Not only is the 2-step process easier to practice than the 1-step process by persons of mediocre technical skill, but in addition, because the operations are not so critical, it is usually possible to feed the material through the calciners more rapidly than in the case of the 1-step process. Consequently, the cost of producing the 2-step product in some cases may be no higher than the cost of production of the 1-step product.

I claim:

1. The improved process for producing, from phosphate rock, an animal feed ingredient containing not less than about 30% of $P_2O_5$, and containing an amount of fluorine not more than about 1/300 part of the $P_2O_5$ content, which comprises grinding the rock, mixing with the ground rock a phosphatic material containing a larger percentage of $P_2O_5$ than contained in the phosphate rock being acted upon, and calcining the mixture at a temperature of not less than about 1150° C. to 1200° C. while actively agitating the same, sufficient $P_2O_5$ being added so that in the final product the mole ratio represented by the following formula is between 2.7 and 3.1

$$\frac{\text{Moles of } CaO + MgO + Na_2O + K_2O - SO_3 - F_2}{\text{Moles of } P_2O_5 - Fe_2O_3 - Al_2O_3}$$

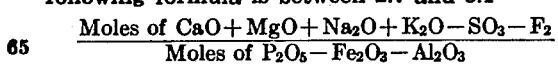

2. The improved process for producing, from phosphate rock, an animal feed ingredient containing not less than about 30% of $P_2O_5$, at least 80% of which is in the form of tricalcium (ortho) phosphate, and containing an amount of fluorine not more than about 1/300 part of the $P_2O_5$ content, which comprises grinding the rock to a fine powder, mixing phosphoric acid with the ground rock, and calcining the mixture at a temperature of not less than about 1200° C. while actively agitating the same, in the presence of a useful amount of water vapor, sufficient phosphoric acid being added so that in the final product the mole ratio represented by the following formula is between 2.7 and 3.1

$$\frac{\text{Moles of } CaO + MgO + Na_2O + K_2O - SO_3 - F_2}{\text{Moles of } P_2O_5 - Fe_2O_3 - Al_2O_3}$$

3. The improved process for producing from phosphate rock an animal feed ingredient containing at least 40% of $P_2O_5$, at least 90% of which is in the form of tricalcium (ortho) phosphate, and containing an amount of fluorine not more than about $1/300$ of the $P_2O_5$ content, which comprises grinding the rock to not less than about 60 mesh, mixing with the ground rock sufficient commercial wet-process phosphoric acid so that in the end product the mole ratio represented by the formula $$\frac{\text{Moles of } CaO + MgO + Na_2O + K_2O - SO_3 - F_2}{\text{Moles of } P_2O_5 - Fe_2O_3 - Al_2O_3}$$

is between 2.7 and 3.1, and gradually raising the temperature of the mixture to not less than about 1200° C. while actively agitating the same, in the presence of a useful amount of water vapor.

4. The improved process for producing from phosphate rock an animal feed ingredient containing about 40% or more of $P_2O_5$, at least 80% of which is in the form of tricalcium (ortho) phosphate, and an amount of fluorine not more than about $1/300$ of the $P_2O_5$, which comprises grinding the rock to a fine powder, mixing with the ground rock sufficient phosphoric acid to impart to the mixture a mole ratio represented by the formula $$\frac{\text{Moles of } CaO + Na_2O + K_2O + MgO}{\text{Moles of } P_2O_5 - Fe_2O_3 - Al_2O_3}$$

which is substantially below 2.7, calcining the material so as to reduce the fluorine content of the product to not more than about $1/300$ of the $P_2O_5$ content of the product, then adding sufficient alkaline material to raise said mole ratio of the material to substantially above 2.8 and recalcining the material so as to produce a final product containing at least 80% of its phosphorus in the form of tricalcium phosphate.

CHARLES A. BUTT.

REFERENCES CITED

The following references are of record in the file of this patent:

UNITED STATES PATENTS

| Number | Name | Date |
|---|---|---|
| 2,234,511 | Wight et al. | Mar. 11, 1941 |
| 2,328,884 | Shoeld | Sept. 7, 1943 |